(12) United States Patent
Hall (10) Patent No.: US 8,068,746 B2
(45) Date of Patent: Nov. 29, 2011

(54) OPTIMUM DC BIAS FOR AN ELECTRO-OPTIC SWITCH

(75) Inventor: David B. Hall, La Crescents, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 610 days.

(21) Appl. No.: 11/881,339

(22) Filed: Jul. 26, 2007

(65) Prior Publication Data

US 2009/0028569 A1    Jan. 29, 2009

(51) Int. Cl.
*H04B 10/04* (2006.01)
(52) U.S. Cl. ........................................ 398/198
(58) Field of Classification Search .................. 398/198
See application file for complete search history.

(56) References Cited

U.S. PATENT DOCUMENTS

| 7,450,288 B2 * | 11/2008 | Kikuchi ........................ 359/239 |
| 2003/0095262 A1 | 5/2003 | Blake |

FOREIGN PATENT DOCUMENTS

| EP | 0 436 344 A | 7/1991 |
| WO | WO 89/11675 A | 11/1989 |

OTHER PUBLICATIONS

"Physics" by Halliday et al., John Wiley & Sons, 1962, pp. 708-709.*
Tetsuya Kawanishi et al; Duobinary Signal Generation Using High-Extinction Ratio Modulation; Optical Fiber Communication/National Fiber Optic Engineers Conference; Feb. 24, 2008; pp. 1-3; Conference on, IEEE; Piscataway, NJ; USA.
Wichers, M. et al; Optical Duobinary Modulation Schemes Using a Mach-Zehnder Transmitter for Lightwave Systems; Transparent Optical Networks, 1999; pp. 15-18; International Conference on Kielce, Poland; Jun. 9-11, 1999; Piscataway, NJ; USA.

* cited by examiner

*Primary Examiner* — Shi K Li
(74) *Attorney, Agent, or Firm* — Carmen Patti Law Group, LLC (57) ABSTRACT

A method for balancing optical transmission for a first ON state and a second ON state of an electro-optic switch having an RF input port and a DC port, in one implementation, comprises the steps of associating a positive RF voltage with the first ON state of the electro-optic switch, associating a negative RF voltage with the second ON state of the electro-optic switch, wherein absolute value of the negative RF voltage associated with the second ON state is approximately equal to the positive RF voltage associated with the first ON state, and balancing optical transmission of the first ON state and the second ON state by adjusting a voltage applied to the DC port to obtain minimum optical transmission in an OFF state of the electro-optic switch.

18 Claims, 8 Drawing Sheets

OPTIMUM DC BIAS FOR AN ELECTRO-OPTIC SWITCH

BACKGROUND

It is known that the standard lithium niobate Mach Zehnder switch has two voltage ports. The first is an RF port to apply short voltage pulses and the second is a DC port to apply the appropriate DC bias voltage. The DC voltage usually sets the switch for minimum throughput when no voltage is applied to the RF port.

The DC voltage for minimum throughput drifts over time and temperature. It is known that application of a small dither voltage to the DC port, and the use of a hill climb servo, can be utilized to find the optimum DC bias point. Since this technique introduces excess noise into the system, it is desirable to find a better method.

SUMMARY

The invention in one implementation encompasses a method for balancing optical transmission for a first ON state and a second ON state of an electro-optic switch having an RF input port and a DC port. In an embodiment, the method comprises the steps of associating a positive RF voltage with the first ON state of the electro-optic switch, associating a negative RF voltage with the second ON state of the electro-optic switch, wherein absolute value of the negative RF voltage associated with the second ON state is approximately equal to the positive RF voltage associated with the first ON state, and balancing optical transmission of the first ON state and the second ON state by adjusting a voltage applied to the DC port to obtain minimum optical transmission in an OFF state of the electro-optic switch.

The invention in another implementation encompasses an improved electro-optic switch having balanced optical outputs, an RF input port, and a DC port. In an embodiment, the improved electro-optic switch comprises means for balancing optical transmission for a first ON state and a second ON state of the electro-optic switch, including means for associating a positive RF voltage with the first ON state of the electro-optic switch, means for associating a negative RF voltage with the second ON state of the electro-optic switch, wherein absolute value of the negative RF voltage associated with the second ON state is approximately equal to the positive RF voltage associated with the first ON state, and means for balancing optical transmission of the first ON state and the second ON state by adjusting a voltage applied to the DC port to obtain minimum optical transmission in an OFF state of the electro-optic switch.

DETAILED DESCRIPTION

An improved method utilizing optical feedback to maintain minimum throughput for changes in the DC voltage in a Mach Zehnder optical switch uses two polarities for the RF voltage pulses. For example, voltage pulses can be 100 nsec long and either type 1 at plus four volts or type 2 at minus four volts. It should be appreciated that, as a result of the improved method described herein, the optical transmission of two different ON states is balanced. The first ON state uses a positive RF voltage and the second ON state uses a negative RF voltage of approximately equal amplitude. The balancing is accomplished by adjusting a common DC voltage for the purpose of obtaining the minimum optical transmission of the OFF state of the switch. Of course, the minimum optical transmission of the OFF state will increase over time without suitable adjustment of the DC voltage.

The normalized type 1 and type 2 outputs of the Mach Zehnder switch are given as:

$$I_1(V, V_P) := \frac{1+\varepsilon}{2} - \frac{1-\varepsilon}{2} \cdot \cos\left(\pi \cdot \frac{V-V_0}{V_\pi} + \pi \cdot \frac{V_P}{V_{P\pi}}\right) \quad (1)$$

$$I_2(V, V_P) := \frac{1+\varepsilon}{2} - \frac{1-\varepsilon}{2} \cdot \cos\left(\pi \cdot \frac{V-V_0}{V_\pi} - \pi \cdot \frac{V_P}{V_{P\pi}}\right) \quad (2)$$

$V_0$ is optical bias
V is applied DC voltage
$V_P$ is applied RF voltage pulse magnitude
$\varepsilon$ is extinction ratio (10 log $\varepsilon$ when expressed in dB)
$V_\pi$ is DC port voltage to go from minimum to maximum output; and
$V_{P\pi}$ is RF port voltage to go from minimum to maximum output.

Half wave voltages $V_\pi$ and $V_{P\pi}$ are not the same; however, both voltages have comparable values of the order of five volts. Minimum output is $\varepsilon$ and maximum output is unity. The form of the equations is based on a Mach Zehnder split ratio that is slightly off from 50-50. Scatter effects that might influence the behavior about the minimum output point are not considered.

The off state for the Mach Zehnder switch with no applied RF voltage is given by:

$$Ioff(V) := \frac{1+\varepsilon}{2} - \frac{1-\varepsilon}{2} \cdot \cos\left(\pi \cdot \frac{V-V_0}{V_\pi}\right) \quad (3)$$

Figure 1:
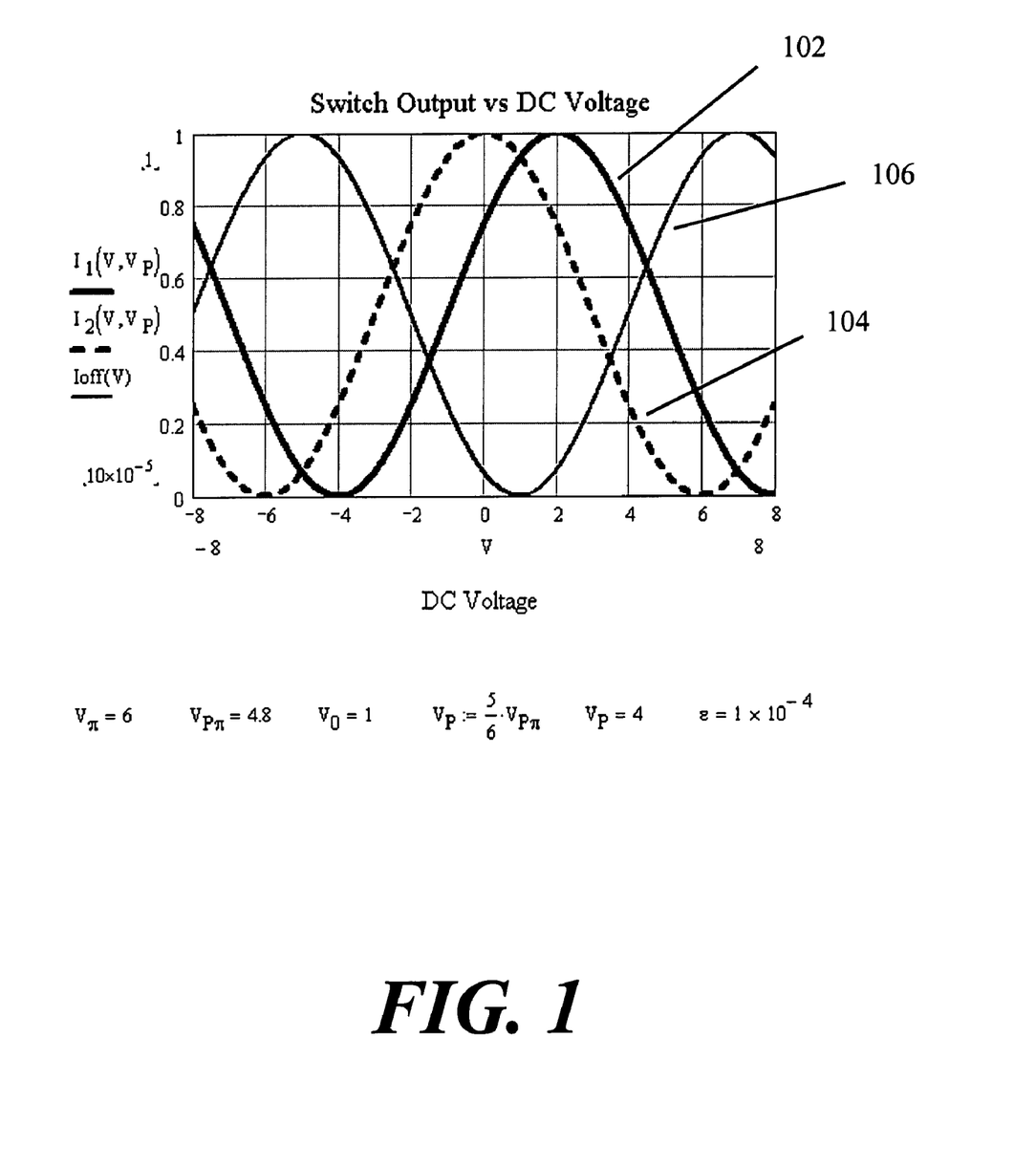
FIG. 1 is a graph showing $I_1$, $I_2$, and Ioff as a function of DC voltage.

When $V=V_0$, the Mach Zehnder output has a minimum value of $\varepsilon$. As can be appreciated from an examination of FIG. 1, which is a plot of $I_1$ 102, $I_2$ 104, and Ioff 106 as a function of DC voltage, at a voltage of 1.0 volt, the balanced outputs $I_1$ 102 and $I_2$ 104 both equal 0.933, and Ioff 106 is equal to $\varepsilon$.

In an embodiment, appropriate DC voltage correction is achieved by means of the visibility function. The visibility of outputs $I_1$ and $I_2$ is given by:

$$VIS(V, V_P) := \frac{I_1(V, V_P) - I_2(V, V_P)}{I_1(V, V_P) + I_2(V, V_P)} \quad (4)$$

Figure 2:
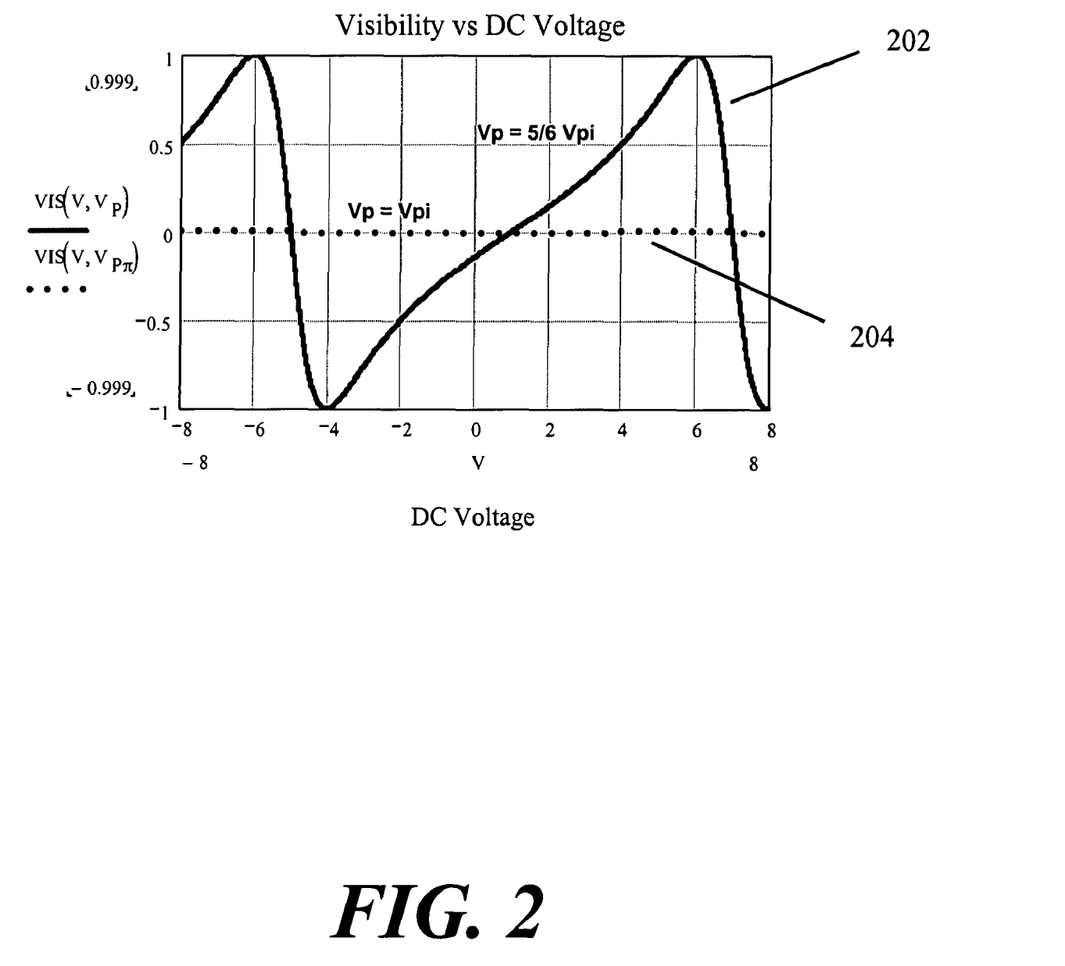
FIG. 2 is a graph illustrating Visibility vs. DC Voltage.

As can be appreciated from proper interpretation of the Visibility vs. DC Voltage plot shown in FIG. 2, visibility goes through zero at the one-volt point where $I_1=I_2$ and the best null is obtained. Over a voltage range of a few volts around one volt, the visibility is proportional to the deviation of V from the one-volt optical bias for the best null. The visibility is an excellent discriminant to make suitable voltage corrections to the optical bias for the best null drifts over time and temperature.

The visibility 204 when $V_P$ is equal to the RF half wave voltage $V_{P\pi}$ is also plotted. It is zero everywhere. This visibility null is used as a calibration tool to adjust $V_P$ 202 to the ⅚ half wave voltage illustrated in FIG. 2. ⅚ is a good number to start with, although other initial values may also work well in this application. It provides a balanced output of 0.933 close to the maximum of 1.00 and a sizeable discriminant. Less than ⅚ provides a larger discriminant and less output, and more than ⅚ provides a smaller discriminant and a balanced output closer to 1.00.

Figure 3:
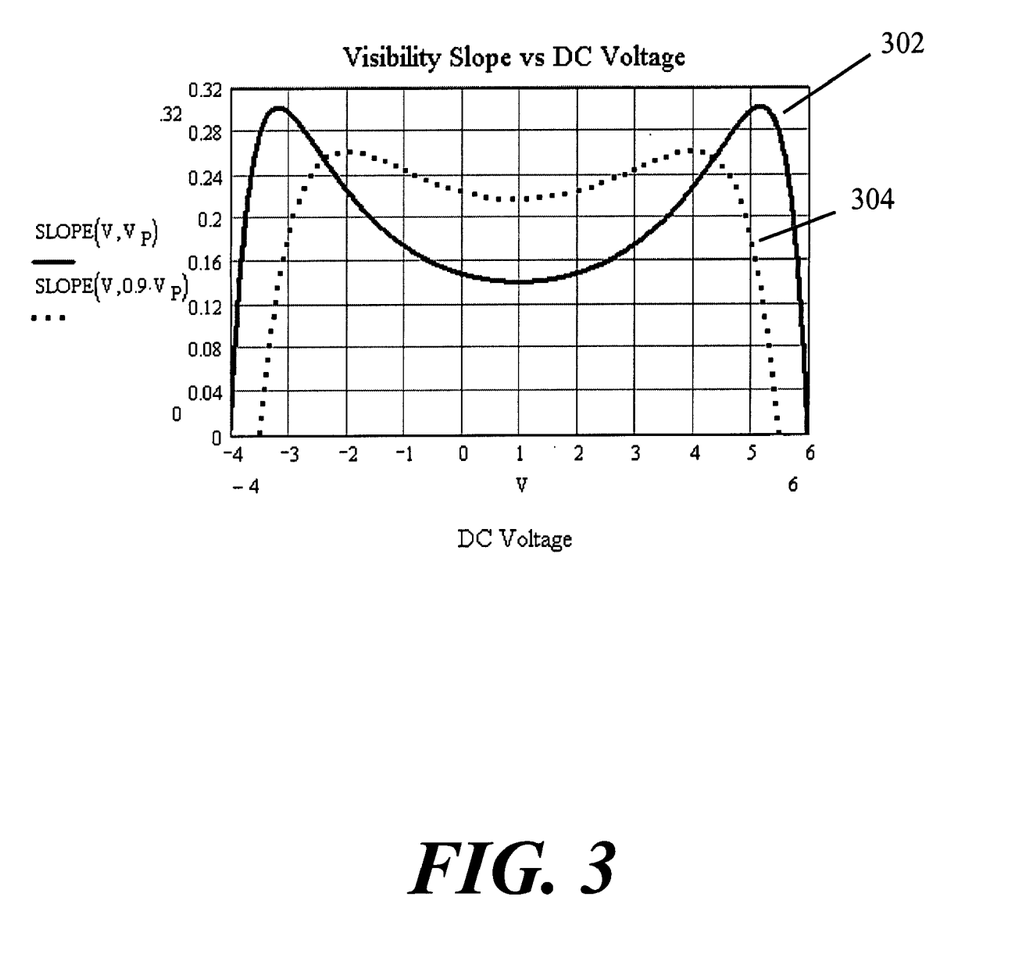
FIG. 3 depicts Visibility Slope as a function of DC Voltage.

A plot of Visibility Slope as a function of DC Voltage is provided in FIG. 3. The Visibility Slope can be expressed as $\Delta VIS/\Delta V$. The slope 302 of the visibility for $V_P=⅚V_{P\pi}$ about the one-volt set point is given by:

$$\text{SLOPE} = \frac{\Delta VIS}{\Delta V} = \frac{0.842}{V_\pi} = 0.141 \text{ per volt} \quad (5)$$

Also illustrated in FIG. 3 is the slope 304 of the visibility for $V_P=\tfrac{9}{10}\times⅚\,V_{P\pi}=¾\,V_{P\pi}$. The slope is greater with more uniformity over a larger voltage range. However, the balanced output drops from 0.933 to 0.853.

From equation (5) above, we obtain the correction voltage needed for a reset to the best null for a measured visibility $VIS_M$:

$$\Delta V_{CORR} = \frac{-VIS_M}{\text{SLOPE}} \quad (6)$$

For example, a measured visibility of 0.05 needs a correction voltage of minus 355 mV. Second order corrections or a look-up table can be used to further refine the correction value needed for a given value of $VIS_M$.

The error in the measured visibility is reduced by signal averaging. For example, a typical pulse train for the switch consists of 100 nsec pulses at 5 μsec intervals. A monitor photodiode that taps a portion of the transmitted light intensity detects the summed outputs of 1000 type 1 light pulses driven by plus 4 volts over a period of 5 msec. Then, it detects the summed outputs of 1000 type 2 light pulses driven by minus 4 volts, also over a period of 5 msec. The total time for data retrieval is 10 msec. The visibility for summed outputs of type 1 and type 2 pulses is then used to program a correction voltage for the best null state.

Figure 4:
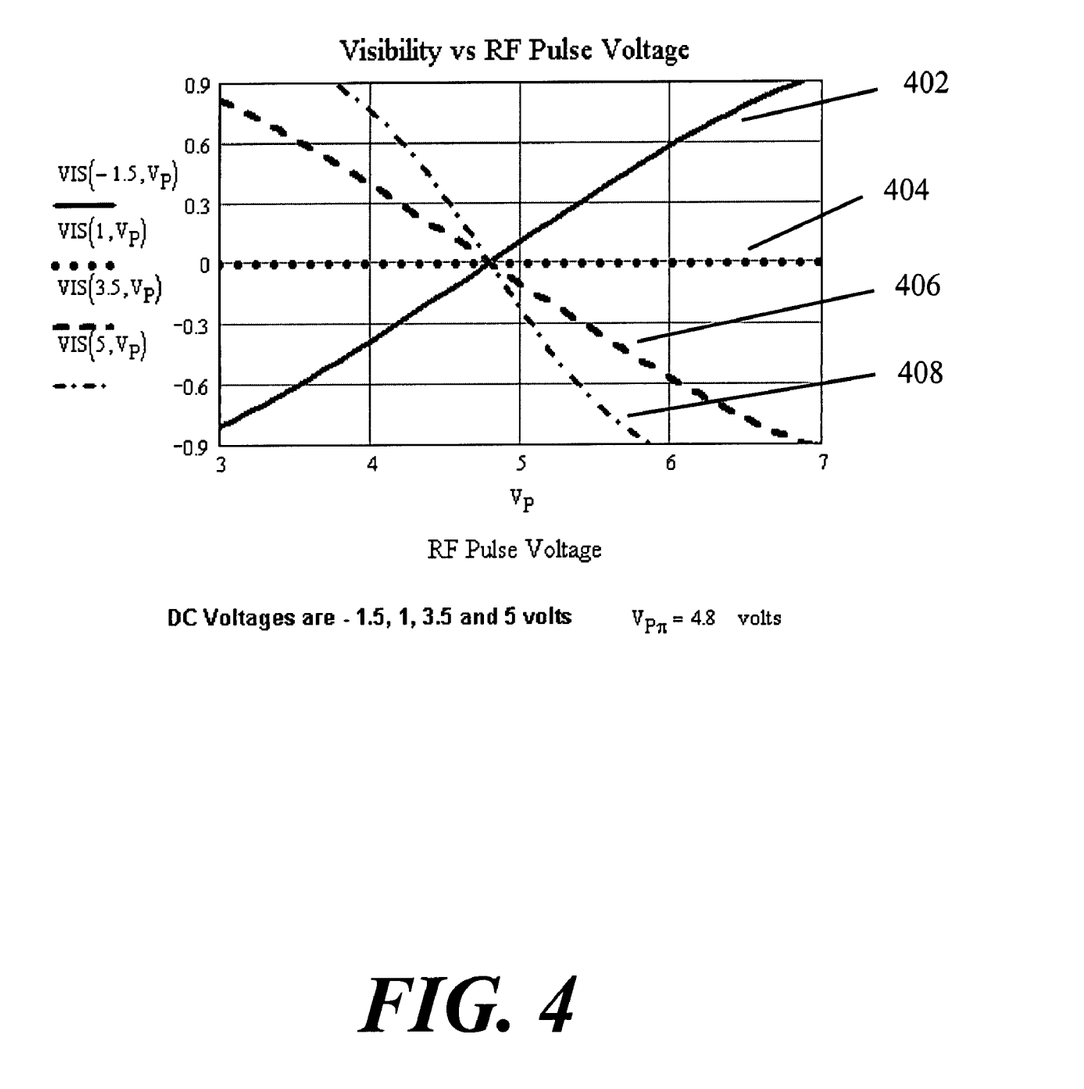
FIG. 4 illustrates Visibility as a function of RF Pulse Voltage for four fixed DC voltages.

FIG. 4 illustrates Visibility as a function of RF Pulse Voltage for four fixed DC voltages. Visibility is illustrated for a DC voltage of −1.5 volts 402, 1.0 volt 404, 3.5 volts 406, and 5 volts 408. The plot of FIG. 4 shows that visibility is a linear function of RF pulse voltage for all DC voltages in the vicinity of $V_P=V_{P\pi}$. To accomplish a suitable calibration of RF pulse voltage $V_{P\pi}$, one simply measures visibility for a given DC voltage at two suitable values of $V_P$ and interpolates.

One should also develop an understanding of extinction ratio performance. The extinction ratio is the residual output at null divided by the peak output. For a balanced output:

$$EXT(V, V_P) := 10 \cdot \log\left(\frac{2 \cdot Ioff(V)}{I_1(V, V_P) + I_2(V, V_P)}\right) \quad (7)$$

Figure 5:
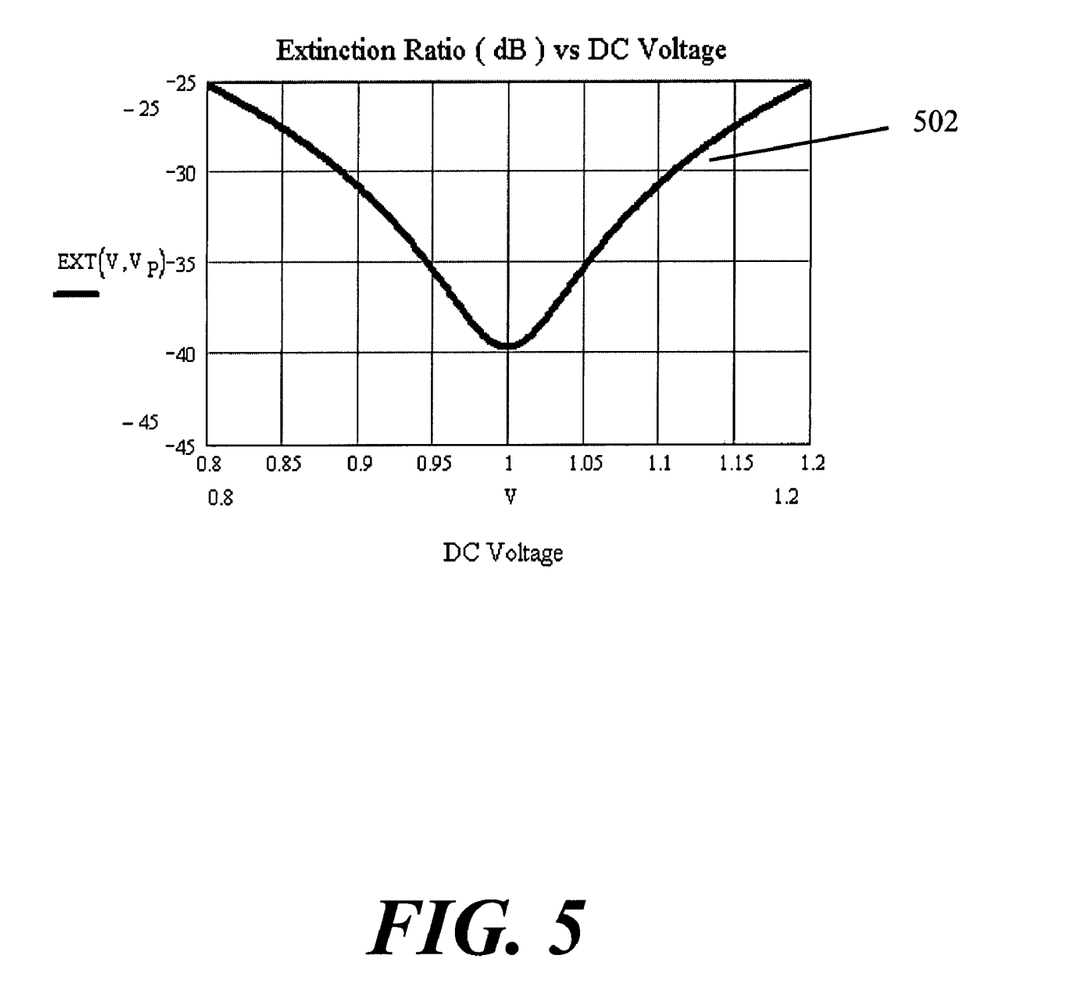
FIG. 5 shows Extinction Ratio in dB about the one volt optical bias as a function of DC Voltage.
Figure 6:
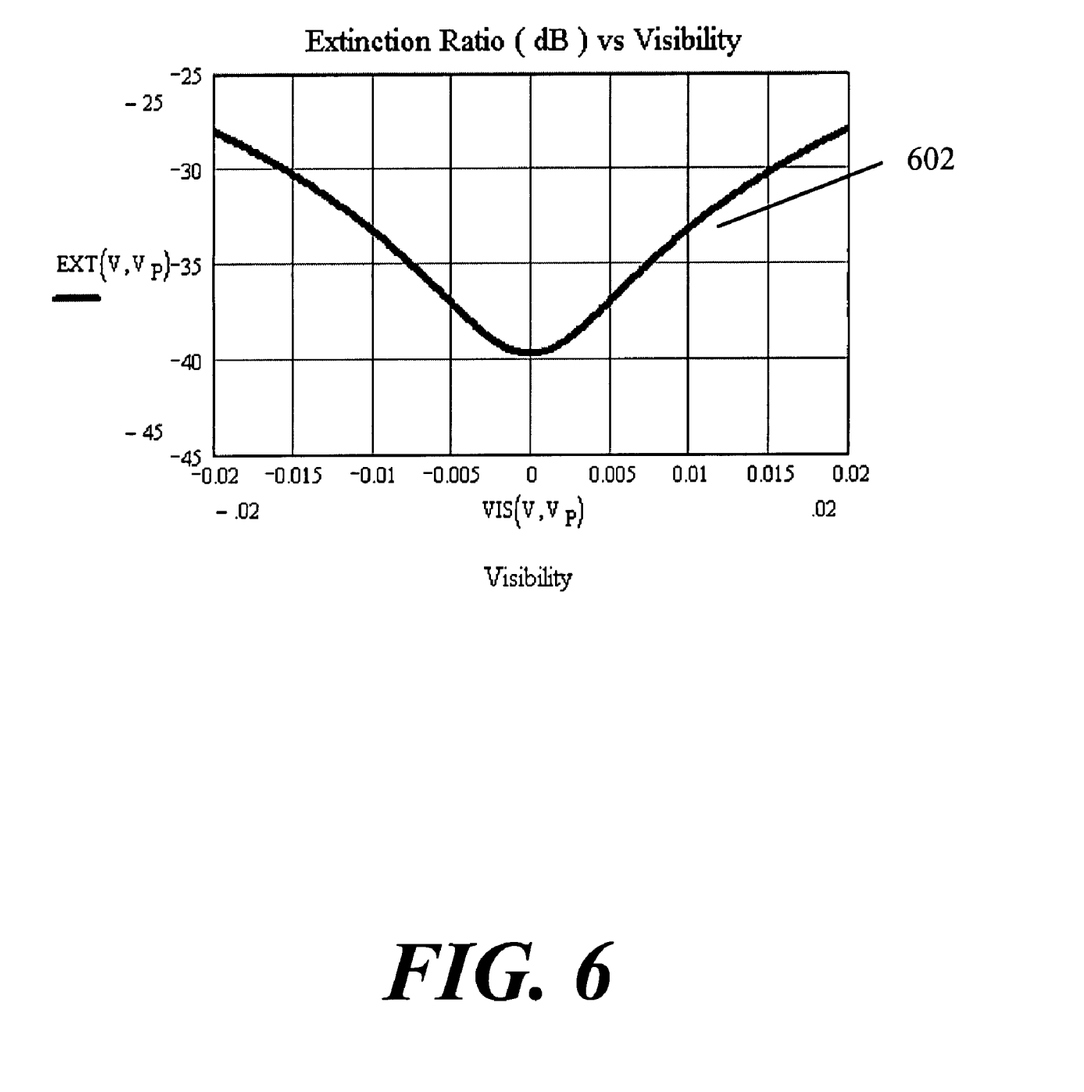
FIG. 6 is a graph of Extinction Ratio (dB) vs. Visibility.

Extinction Ratio 502 in dB about the one volt optical bias as a function of DC Voltage is shown in FIG. 5. A graph of Extinction Ratio (dB) 602 vs. Visibility is provided in FIG. 6. A deviation of 50 mV from the best null point at 1.0 volt yields an extinction ratio of −35 dB, and a deviation of 110 mV yields an extinction ration of −30 dB. It should be noted that the null does not quite reach −40 dB. This is because the balanced on state output is slightly less than the maximum output. It is apparent from the Extinction Ratio (dB) vs. Visibility plot of FIG. 6 that a visibility of 0.7% yields an extinction ratio of −35 dB, and a visibility of 1.5% corresponds to an extinction ratio of −30 dB. In short, a 50 mV deviation from the best null point translates to a −35 dB null and a relative difference in the type 1 and type 2 pulsed outputs of 1.4%.

Figure 7:
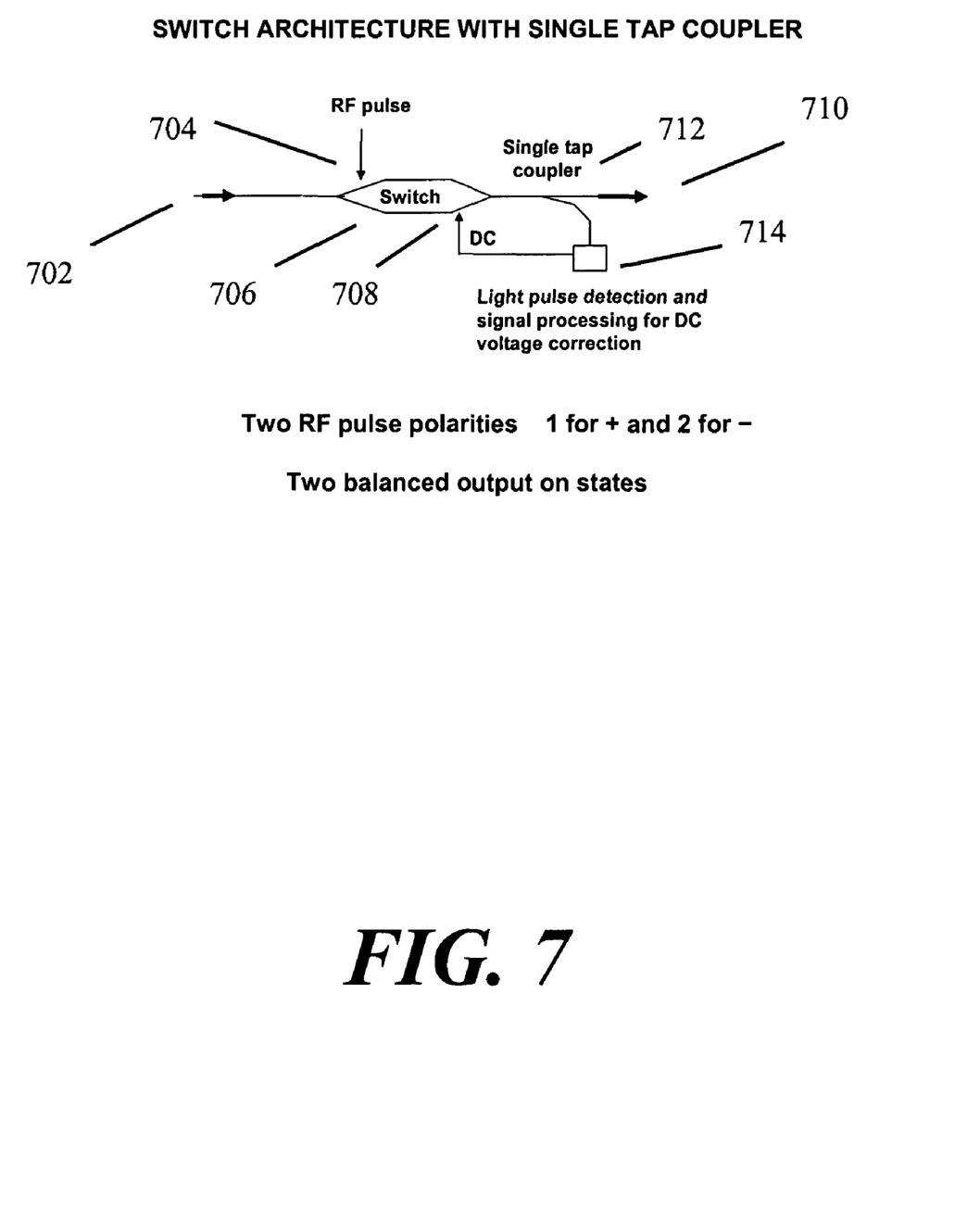
FIG. 7 is a simplified block diagram of a balanced driver switch architecture.

FIG. 7 is a simple block diagram of the balanced driver switch architecture. An input optical signal is applied to the input port 702 of the switch 706. An RF pulse voltage is applied to the RF port 704, while the appropriate DC bias voltage is applied to the DC port 708. A single tap coupler 712 applies a portion of the optical output 710 to a light pulse detection and signal processing module 714 to determine DC voltage correction.

Figure 8:
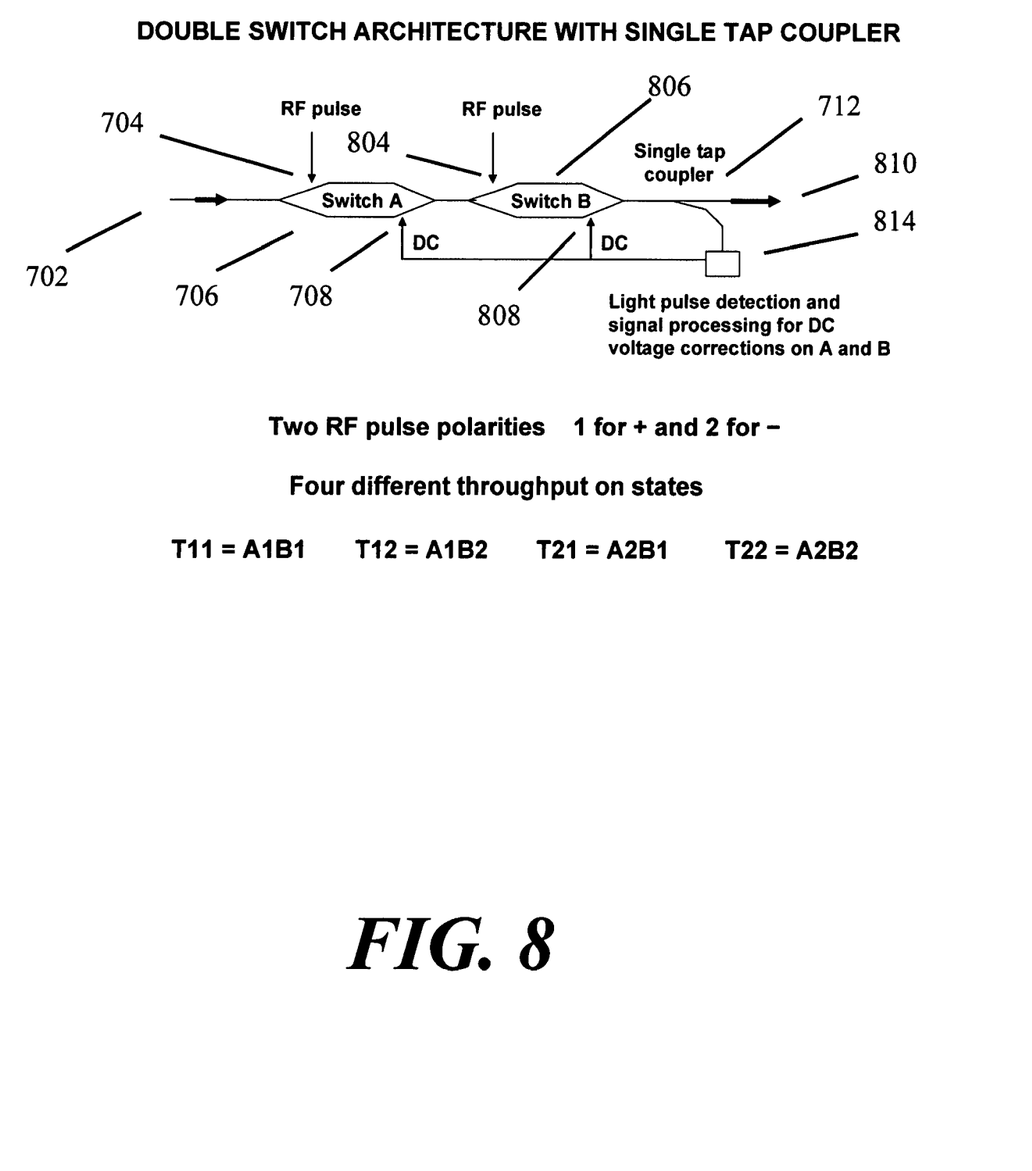
FIG. 8 is a simplified block diagram of a balanced driver switch architecture utilizing cascaded electro-optic switches.

In order to achieve higher attenuations than normally available with a single switch, a cascaded architecture as shown in FIG. 8 may be implemented. Some applications may require extinction ratios exceeding 60 dB that cannot be attained with a single switch. In addition to the features set forth in FIG. 7, FIG. 8 shows a second cascaded switch 806 having an RF port 804 and a DC port 808. The single tap coupler 712 at the output of the second switch 806 applies a portion of the optical output 810 to the light pulse detection and signal processing module 814 to provide proper DC voltage corrections to both switches 706, 806.

Of course, there are many iterative processes readily adaptable for finding suitable voltages for properly balanced optical transmission. For example, one may wish to begin with no RF pulse voltage applied to the RF port of the switch, then measure transmitted optical power over a range of DC voltages known to include the proper operating voltage based upon characterizing date supplied by the manufacturer.

When one wishes to apply a proper initiation procedure to each of a pair of cascaded switches, start by applying a positive DC voltage to the second modulator while recording transmitted optical power over a range of DC voltages applied to the first modulator. This process continues with application of a negative DC voltage to the second modulator, and subsequent measurement of transmitted optical power over the same range of DC voltages applied to the first modulator.

To continue the iterative process, the DC voltages applied to the first modulator are fixed and the transmitted optical power is measured over a range of DC voltages applied to the second modulator. Once the DC voltages associated with the largest and smallest transmitted optical powers have been determined, one can then iteratively determine the RF pulse voltages associated with zero visibility. Visibility for each switch independently can be characterized using the relation:

$$VIS(V_{DC}, V_{RF}) = \frac{P(V_{DC}, V_{RF}) - P(V_{DC}, -V_{RF})}{P(V_{DC}, V_{RF}) + P(V_{DC}, -V_{RF})} \quad (8)$$

where P is transmitted optical power.

The steps or operations described herein are intended as examples. Numeric values provided for RF and DC voltage levels reflect operation with only one type of modulator. Optimum operating voltages may differ depending upon modulator manufacturer, type, part number, lot number, etc. Consequently, the numeric values discussed herein are intended as examples only. The method described herein will act to optimize operation of an electro-optic switch independent of particular operating voltage levels. There may be many variations to these steps or operations without departing from the spirit of the invention. For instance, the steps may be performed in a differing order, or steps may be added, deleted, or modified.

Although examples of implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims. The processes described herein may be performed using DSPs (digital signal processors) and one or more associated microcomputers, utilizing stored programs assessed from memory devices such as hard disk systems, optical disks, or semiconductor memory, for example.

What is claimed is:

1. A method for balancing optical transmission for a first ON state and a second ON state to find a minimum off state of an electro-optic switch having an RF input port and a DC port, the method comprising the steps of:
   (a) associating a positive RF voltage with the first ON state of the electro-optic switch;
   (b) associating a negative RF voltage with the second ON state of the electro-optic switch, wherein absolute value of the negative RF voltage associated with the second ON state is approximately equal to the positive RF voltage associated with the first ON state;
   (c) balancing optical transmission of the first ON state and the second ON state by adjusting a voltage applied to the DC port to obtain minimum optical transmission in an OFF state of the electro-optic switch;
   (d) selecting an initial DC voltage level and an initial RF port voltage by measuring visibility over a range of predetermined DC voltages and a range of predetermined RF port voltages, then selecting the initial DC voltage associated with minimum measured visibility;
   (e) determining visibility slope as a function of DC voltage; and
   (f) applying a correction voltage to the initial DC voltage level, where the correction voltage is a function of visibility measured at operating values of DC port voltage and RF port voltage, and the visibility slope.

2. The method in accordance with claim 1, wherein the step of determining visibility slope further comprises the steps of:
   (b1) determining visibility over a range of DC voltages proximate the initial DC voltage level in accordance with the relation $$VIS(V, V_P) := \frac{I_1(V, V_P) - I_2(V, V_P)}{I_1(V, V_P) + I_2(V, V_P)}$$

where:
V is applied DC voltage
$V_P$ is applied RF voltage pulse magnitude
I1 is normalized output of the electro-optic switch corresponding to a first value of RF voltage pulses;
I2 is normalized output of the electro-optic switch corresponding to a second value of RF voltage pulses; and
   (b2) computing visibility slope in accordance with the relation SLOPE=$\Delta$VIS/$\Delta V$ where:
$\Delta$VIS is change in visibility value; and
$\Delta V$ is change in applied DC voltage.

3. The method in accordance with claim 2, wherein normalized outputs of the electro-optic switch are determined in accordance with the relations $$I_1(V, V_P) := \frac{1+\varepsilon}{2} - \frac{1-\varepsilon}{2} \cdot \cos\left(\pi \cdot \frac{V - V_0}{V_\pi} + \pi \cdot \frac{V_P}{V_{P\pi}}\right);$$

and $$I_2(V, V_P) := \frac{1+\varepsilon}{2} - \frac{1-\varepsilon}{2} \cdot \cos\left(\pi \cdot \frac{V - V_0}{V_\pi} - \pi \cdot \frac{V_P}{V_{P\pi}}\right);$$

where:
$V_0$ is an applied correction voltage
V is applied DC voltage
$V_P$ is applied RF voltage pulse magnitude
$\epsilon$ is extinction ratio (10 log $\epsilon$ when expressed in dB)
$V_\pi$ is DC port voltage to go from minimum to maximum output;
$V_{P\pi}$ is RF port voltage to go from minimum to maximum output and
wherein $V_P$ corresponds to a series of RF pulses at a positive RF voltage for determination of $I_1$, and to a series of RF pulses at a negative RF voltage whose absolute value is approximately equal to the positive RF voltage for determination of $I_2$.

4. The method in accordance with claim 3, wherein error in measured visibility is reduced through signal averaging by:
   detecting summed output values $I_1$ corresponding to a series of RF pulses at a positive RF voltage over a first predetermined time period, then detecting summed output values $I_2$ corresponding to a series of RF pulses at a negative RF voltage whose absolute value is approximately equal to the positive RF voltage, over a second predetermined time period substantially equal to the first predetermined time period; and
   determining visibility using the summed output values.

5. The method in accordance with claim 1, wherein the step (c) of applying a correction voltage to the initial DC voltage level further comprises the step of determining the correction voltage in accordance with the relation $$\Delta V_{CORR} = \frac{-VIS_M}{\text{SLOPE}}$$

where:
ΔV$_{CORR}$ is the correction voltage
VIS$_M$ is measured visibility; and
SLOPE is visibility slope.

6. The method of claim 1 further comprising applying, via a tap coupler, a portion of the optical transmission to a light pulse detection processing module where the light pulse detection processing module determines a DC voltage correction that is applied to the DC port to balance the optical transmission of the first ON state and the second ON state.

7. A method for determining optimum DC bias point for an electro-optic switch having balanced optical outputs, an RF input port, and a DC port, the method comprising the steps of:
(a) selecting an initial DC voltage level and an initial RF port voltage by measuring visibility over a range of predetermined DC voltages and a range of predetermined RF port voltages, then selecting the initial DC voltage associated with minimum measured visibility;
(b) determining visibility over a range of DC voltages proximate the initial DC voltage level in accordance with the relation $$VIS(V, V_P) := \frac{I_1(V, V_P) - I_2(V, V_P)}{I_1(V, V_P) + I_2(V, V_P)}$$

where:
V is applied DC voltage
V$_P$ is applied RF voltage pulse magnitude
I1 is normalized output of the electro-optic switch corresponding to a first value of RF voltage pulses; and
I2 is normalized output of the electro-optic switch corresponding to a second value of RF voltage pulses;
(c) computing visibility slope in accordance with the relation

SLOPE=ΔVIS/ΔV where:
ΔVIS is change in visibility value;
ΔV is change in applied DC voltage; and
(d) applying a correction voltage to the initial DC voltage level, wherein the correction voltage is determined in accordance with the relation $$\Delta V_{CORR} = \frac{-VIS_M}{SLOPE}$$

where:
ΔV$_{CORR}$ is the correction voltage
VIS$_M$ is measured visibility; and
SLOPE is visibility slope.

8. The method in accordance with claim 7, wherein normalized outputs of the electro-optic switch are determined in accordance with the relations $$I_1(V, V_P) := \frac{1+\varepsilon}{2} - \frac{1-\varepsilon}{2} \cdot \cos\left(\pi \cdot \frac{V-V_0}{V_\pi} + \pi \cdot \frac{V_P}{V_{P\pi}}\right);$$
and
$$I_2(V, V_P) := \frac{1+\varepsilon}{2} - \frac{1-\varepsilon}{2} \cdot \cos\left(\pi \cdot \frac{V-V_0}{V_\pi} - \pi \cdot \frac{V_P}{V_{P\pi}}\right);$$

where:
V$_0$ is an applied correction voltage
V is applied DC voltage
V$_P$ is applied RF voltage pulse magnitude
ε is extinction ratio (10 log ε when expressed in dB)
V$_\pi$ is DC port voltage to go from minimum to maximum output;
V$_{P\pi}$ is RF port voltage to go from minimum to maximum output; and
wherein V$_P$ corresponds to a series of RF pulses at a positive RF voltage for determination of I$_1$, and to a series of RF pulses at a negative RF voltage whose absolute value is approximately equal to the positive RF voltage for determination of I$_2$.

9. The method in accordance with claim 8, wherein error in measured visibility is reduced through signal averaging by:
detecting summed output values I$_1$ corresponding to a series of RF pulses at a positive RF voltage over a first predetermined time period, then detecting summed output values I$_2$ corresponding to a series of RF pulses at a negative RF voltage whose absolute value is approximately equal to the positive RF voltage, over a second predetermined time period substantially equal to the first predetermined time period; and
determining visibility using the summed output values.

10. A system comprising an electro-optic switch having balanced optical outputs, an RF input port, and a DC port, wherein the system:
balances optical transmission for a first ON state and a second ON state of the electro-optic switch wherein balancing optical transmission for a first ON state and a second ON state comprises:
associating a positive RF voltage with the first ON state of the electro-optic switch;
associating a negative RF voltage with the second ON state of the electro-optic switch, wherein absolute value of the negative RF voltage associated with the second ON state is approximately equal to the positive RF voltage associated with the first ON state;
balancing optical transmission of the first ON state and the second ON state by adjusting a voltage applied to the DC port to obtain minimum optical transmission in an OFF state of the electro-optic switch;
measures visibility over a range of predetermined DC voltages and a range of predetermined RF port voltages;
selects an initial DC voltage associated with minimum measured visibility and determines visibility slope as a function of DC voltage; and
applies a correction voltage to the initial DC voltage level, where the correction voltage is a function of visibility measured at operating values of DC port voltage and RF port voltage, and the visibility slope.

11. The system of claim 10, wherein determining visibility slope further comprises:
determining visibility over a range of DC voltages proximate the initial DC voltage level in accordance with the relation $$VIS(V, V_P) := \frac{I_1(V, V_P) - I_2(V, V_P)}{I_1(V, V_P) + I_2(V, V_P)}$$

where:
V is applied DC voltage
V$_P$ is applied RF voltage pulse magnitude

I1 is a first normalized output of the electro-optic switch corresponding to a first value of RF voltage pulses;

I2 is a second normalized output of the electro-optic switch corresponding to a second value of RF voltage pulses; and means for computing visibility slope in accordance with the relation

SLOPE=ΔVIS/ΔV where:

ΔVIS is change in visibility value; and

ΔV is change in applied DC voltage.

12. The system of claim 11, further comprising determining normalized outputs of the electro-optic switch in accordance with the relations $$I_1(V, V_P) := \frac{1+\varepsilon}{2} - \frac{1-\varepsilon}{2} \cdot \cos\left(\pi \cdot \frac{V-V_0}{V_\pi} + \pi \cdot \frac{V_P}{V_{P\pi}}\right);$$

and $$I_2(V, V_P) := \frac{1+\varepsilon}{2} - \frac{1-\varepsilon}{2} \cdot \cos\left(\pi \cdot \frac{V-V_0}{V_\pi} - \pi \cdot \frac{V_P}{V_{P\pi}}\right);$$

where:

$V_0$ is an applied correction voltage

V is applied DC voltage $V_P$ is applied RF voltage pulse magnitude $\varepsilon$ is extinction ratio (10 log $\varepsilon$ when expressed in dB)

$V_\pi$ is DC port voltage to go from minimum to maximum output;

$V_{P\pi}$ is RF port voltage to go from minimum to maximum output; and wherein $V_P$ corresponds to a series of RF pulses at a positive RF voltage for determination of $I_1$, and to a series of RF pulses at a negative RF voltage whose absolute value is approximately equal to the positive RF voltage for determination of $I_2$.

13. The system of claim 12, further comprising reducing error in measured visibility through signal averaging comprising:

detecting summed output values $I_1$ corresponding to a series of RF pulses at a positive RF voltage over a first predetermined time period;

detecting summed output values $I_2$ corresponding to a series of RF pulses at a negative RF voltage whose absolute value is approximately equal to the positive RF voltage, over a second predetermined time period substantially equal to the first predetermined time period; and determining visibility using the summed output values.

14. The system of claim 10, wherein applying a correction voltage to the initial DC voltage level further, comprises determining the correction voltage in accordance with the relation $$\Delta V_{CORR} = \frac{-VIS_M}{\text{SLOPE}}$$

where:

$\Delta V_{CORR}$ is the correction voltage $VIS_M$ is measured visibility; and

SLOPE is visibility slope.

15. The system of claim 10 further comprising a tap coupler which applies a portion of the optical transmission to a light pulse detection processing module where the light pulse detection processing module determines a DC voltage correction that is applied to the DC port to balance the optical transmission of the first ON state and the second ON state.

16. A system comprising an electro-optic switch having balanced optical outputs, an RF input port, and a DC port, where the system:

selects an initial DC voltage level and an initial RF port voltage by measuring visibility over a range of predetermined DC voltages and a range of predetermined RF port voltages, then selecting the initial DC voltage associated with minimum measured visibility;

determines visibility over a range of DC voltages proximate the initial DC voltage level in accordance with the relation $$VIS(V, V_P) := \frac{I_1(V, V_P) - I_2(V, V_P)}{I_1(V, V_P) + I_2(V, V_P)}$$

where:

V is applied DC voltage $V_P$ is applied RF voltage pulse magnitude

I1 is normalized output of the electro-optic switch corresponding to a first value of RF voltage pulses; and I2 is normalized output of the electro-optic switch corresponding to a second value of RF voltage pulses;

computing visibility slope in accordance with the relation

SLOPE=ΔVIS/ΔV where:

ΔVIS is change in visibility value;

ΔV is change in applied DC voltage; and applies a correction voltage to the initial DC voltage level, wherein the correction voltage is determined in accordance with the relation $$\Delta V_{CORR} = \frac{-VIS_M}{\text{SLOPE}}$$

where:

$\Delta V_{CORR}$ is the correction voltage $VIS_M$ is measured visibility; and

SLOPE is visibility slope.

17. The system of claim 16, wherein the system determines normalized outputs of the electro-optic switch in accordance with the relations $$I_1(V, V_P) := \frac{1+\varepsilon}{2} - \frac{1-\varepsilon}{2} \cdot \cos\left(\pi \cdot \frac{V-V_0}{V_\pi} + \pi \cdot \frac{V_P}{V_{P\pi}}\right);$$

and $$I_2(V, V_P) := \frac{1+\varepsilon}{2} - \frac{1-\varepsilon}{2} \cdot \cos\left(\pi \cdot \frac{V-V_0}{V_\pi} - \pi \cdot \frac{V_P}{V_{P\pi}}\right);$$

where:

$V_0$ is an applied correction voltage

V is applied DC voltage $V_P$ is applied RF voltage pulse magnitude $\varepsilon$ is extinction ratio (10 log $\varepsilon$ when expressed in dB)

$V_\pi$ is DC port voltage to go from minimum to maximum output;

$V_{P\pi}$ is RF port voltage to go from minimum to maximum output; and wherein $V_P$ corresponds to a series of RF pulses at a positive RF voltage for determination of $I_1$, and to a series of RF pulses at a negative RF voltage whose absolute value is approximately equal to the positive RF voltage for determination of $I_2$.

18. The system of claim 17, further comprising reducing error in measured visibility comprising:
   detecting summed output values $I_1$ corresponding to a series of RF pulses at a positive RF voltage over a first predetermined time period;
   detecting summed output values $I_2$ corresponding to a series of RF pulses at a negative RF voltage whose absolute value is approximately equal to the positive RF voltage, over a second predetermined time period substantially equal to the first predetermined time period; and
   determining visibility using the summed output values.

* * * * *